Sept. 22, 1925.
A. L. R. ELLIS
1,554,980
METHOD OF AND MEANS FOR CALIBRATING INSTRUMENTS FOR
THE TRANSMISSION OF ANGULAR MOTION
Filed June 21, 1923
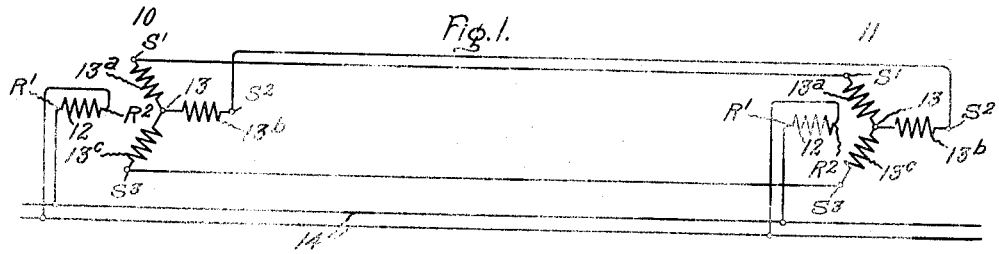
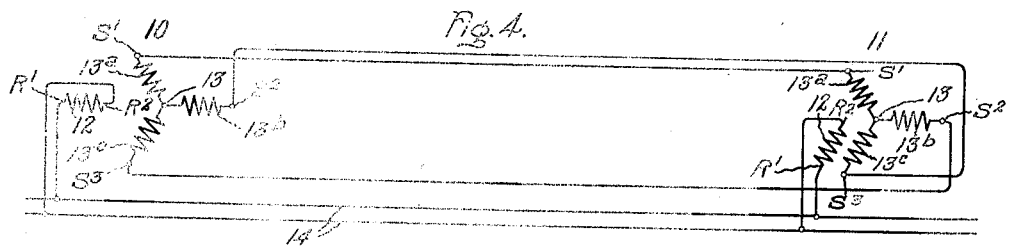
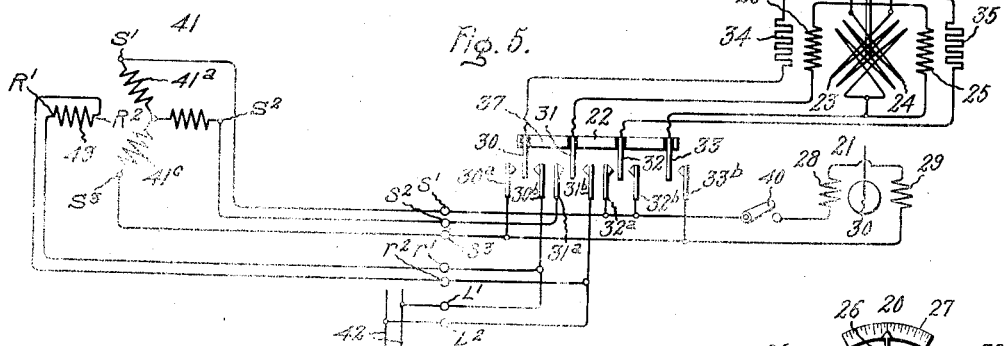
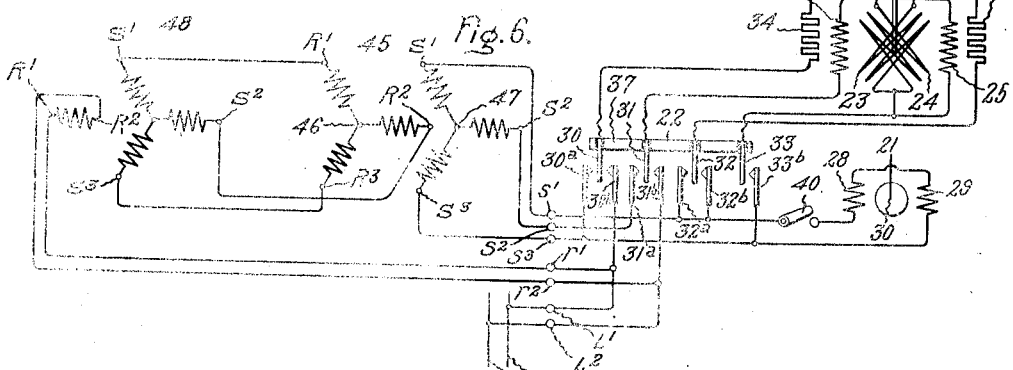
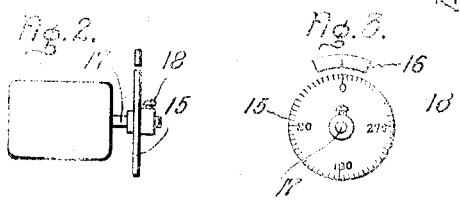
Inventor:
Alvarado L. R. Ellis,
by
His Attorney.

Patented Sept. 22, 1925.

1,554,980

UNITED STATES PATENT OFFICE.

ALVARADO L. R. ELLIS, OF LYNN, MASSACHUSETTS, ASSIGNOR TO GENERAL ELECTRIC COMPANY, A CORPORATION OF NEW YORK.

METHOD OF AND MEANS FOR CALIBRATING INSTRUMENTS FOR THE TRANSMISSION OF ANGULAR MOTION.

Application filed June 21, 1923. Serial No. 646,946.

*To all whom it may concern:*

Be it known that I, ALVARADO L. R. ELLIS, a citizen of the United States, residing at Lynn, in the county of Essex, State of Massachusetts, have invented certain new and useful Improvements in Methods of and Means for Calibrating Instruments for the Transmission of Angular Motion, of which the following is a specification.

My invention relates to a method of and means for calibrating instruments or devices used in the transmission of angular motion, and has for its object the provision of method and means whereby the instruments may be calibrated in such manner that any two or more instruments may be connected together so as to operate in synchronism.

My invention has particular application in the calibration of instruments for the transmission of angular motion of the type having an alternating field rotatably and inductively cooperating with a polycircuit armature winding. One method of calibrating instruments of this character is described and claimed in a copending application of Edward M. Hewlett and Waldo W. Willard, Serial No. 631,728, filed April 12, 1923, assigned to the same assignee as this invention, of which this invention is an improvement. Such instruments have an infinite number of possible angular stops, or positions, and are, therefore, particularly adapted for purposes requiring extreme accuracy. When thus used the various instruments in a given system must be synchronized or coordinated with great accuracy in order that the accuracy of the instruments may be taken advantage of. The synchronization of the instruments may be and ordinarily is accomplished by comparing the instruments after they have been connected into a system and setting their indicators on zero. This is a tedious process as well as giving unreliable results, especially so in complicated systems involving a large number of instruments located at remote points.

For a more complete understanding of my invention reference should be had to accompanying drawings in which Fig. 1 shows a system for the transmission of angular motion to which my invention is applicable; Fig. 2 is a side elevation view of a transmitting or receiving instrument; Fig. 3 is an end elevation view of the instrument; Fig. 4 shows a possible error resulting from connecting the instruments improperly; Fig. 5 shows in diagrammatic form means for calibrating instruments embodying my invention; while Fig. 6 shows a modified form of my invention.

Referring to Fig. 1 of the drawing, I have shown my invention in one form as applied to instruments for transmission of angular motion in which both the transmitting instrument or device 10 and the receiving instrument or device 11 are provided with a single circuit field winding 12 and a polycircuit armature winding 13. As shown in the drawing, the field windings 12 of the transmitting and receiving instruments each consists of a single coil which is energized from a suitable source of alternating current whereby an alternating flux is set up interlinking with the associated armature winding 13. Preferably, the field windings are mounted on the rotor elements of the instruments, while the armature windings are mounted on the stator elements although this relation may be reversed, the two windings in each instrument being in inductive relation. As shown in the drawing, the armature windings each comprise three coils or legs, 13$^a$, 13$^b$, and 13$^c$, which are connected in Y relation. Obviously, if desired, the armature coils may be connected in delta.

In the operation of such instruments, the rotor windings are connected to a suitable source of alternating current 14, while like points of the stator windings are interconnected. When two instruments are connected in the relation shown in Fig. 1, the two rotors will stand in corresponding angular positions with relation to their field windings in which positions the voltages induced by the field windings in the various legs of the interconnected armature windings are equal and opposite and hence no current flows in the armature windings. Upon movement of the rotor of the transmitting instrument 10, the values of the various voltages induced in the legs of the armature windings of the transmitter are changed whereby a current flow is set up in the armature windings and the resulting torque exerted on the rotor of the receiving instrument causes it to follow the rotor of the transmitting instrument. As shown in Figs. 2 and 3 the rotor of each instrument is provided with a suitable indicating device such as a dial 15 calibrated in degrees, this dial cooperating with a stationary reference mark 16. The dial 15 is releasably secured to the rotor shaft 17 of the instrument, for example, by means of a clamping screw 18 whereby the dial may be loosened, turned on the shaft, and secured in any desired angular position thereon.

Obviously, if like points of the armature windings of the transmitting and receiving instruments are not connected together the rotor of the receiving instrument will not take up a position corresponding to the position of the rotor of the transmitting instrument. An example of this latter condition is illustrated in Fig. 4 in which terminals $S^2$ and $S^3$ on the receiving instrument are reversed. The rotor of the receiving instrument in this case assumes a position of 60 degrees displacement with relation to the rotor of the transmitting instrument, and also its rotation is reversed. Likewise, if the terminals of the field windings are wrongly connected to the source of supply an error will result. Obviously this error amounts to 180 degrees since the polarity of the field winding will be reversed if its terminals are reversed.

Therefore, for operation of the rotors of the instruments in synchronism corresponding terminals of the armature windings must be connected together and the field windings must be connected in a definite relation to the source of supply. This correct connection of the instruments, while synchronizing the rotors, is obviously not sufficient to assure the same indication on all the dials, but each dial must be set on zero, for example, and secured to the rotor while the rotor is in a definite position.

In accordance with the method of calibrating instruments described and claimed in the aforesaid application of Edward M. Hewlett and Waldo W. Willard, the armature and field winding terminals are marked by inspection in a definite order, for example, in a clockwise direction as shown in Fig. 1 when looking at a definite end of the instrument, for example, the slip ring end. The instruments may then be connected correctly together as shown in Fig. 1 so that the rotor of the receiving instrument will operate in angular agreement with the rotor of the transmitting instrument. The field winding is then set in a definite electrical zero position in which a predetermined relation is established between the voltage applied to the field winding and the voltage induced in the armature winding and the dials set on zero and secured to the rotors with the rotors held in this zero position.

In accordance with my invention I apply a test whereby I am able to check the marking of the terminals and thus determine whether they have been correctly marked. I also provide apparatus whereby this test and the various other steps in the calibration of the instruments may be carried out in a simple reliable and efficient manner.

Referring to Fig. 5, the apparatus for calibrating instruments comprises in one form of my invention two instruments 20 and 21 and a transfer switch 22. Instrument 20 is similar in construction to a power factor meter. It is shown as comprising two rotatably mounted armature coils 23 and 24 placed at approximately right angles with each other, and two stationary field coils 25. Moving with the armature coils is a pointer 26 which cooperates with a suitable stationary scale 27. The instrument 21 is a vibrating reed galvanometer of a well known form. It comprises an electro-magnet energized by coils 28 and 29 between the poles of which vibrates a stationary flexible reed 30 having a definite polarity. The reed may be mounted on one end of a permanent magnet (not shown). In the operation of instrument 21, when an alternating voltage having a frequency corresponding to the natural period of vibration of the reed 30 is applied to the coils 28 and 29, the reed will be set in vibration. This instrument is very sensitive to small voltages and is also adapted to have relatively high voltages applied to it without injury. It is, therefore, particularly suited for use in calibrating instruments in accordance with my invention.

The transfer switch 22 comprises four insulated movable contacts 30 to 33 inclusive. Contacts 30 and 32 are connected through resistances 34 and 35 to corresponding terminals of the armature coils 23 and 24, while contact 31 is connected through field coils 25 to the opposite terminals of coils 23 and 24, contact 31 being connected directly to the same point. For convenience in operation the contacts are shown mounted in insulated relation on a single operating member or bar 37. Contacts 30, 31 and 32 each move between a pair of spaced stationary contacts, contact 30 moving between stationary contacts $30^a$ and $30^b$, contact 31 between stationary contacts $31^a$ and $31^b$, contact 32 between stationary contacts $32^a$ and $32^b$, while contact 33 engages a stationary contact $33^b$ when the switch bar 37 is thrown to the right. Stationary contacts $30^b$, $31^a$ and $31^b$ are connected respectively to terminals or binding posts $r^1$, $s^2$ and $r^2$, contacts $30^a$ and $33^b$ are connected to a terminal or binding post $s^3$, while contacts $32^a$ and $32^b$ are connected to a terminal or binding post $s^1$. Contacts $30^b$ and 31$^b$ are also connected respectively to binding posts L$^1$ and L$^2$. By throwing the switch bar 37 to the left therefore, coil 24 is connected in series with the field coils across binding posts $s^2$ and $s^3$ and coil 23 in series with the field coils across binding posts $s^1$ and $s^2$. By throwing the switch bar 37 to the right coil 24 is connected in series with the field coils across binding posts $r^1$ and $r^2$, and L$^1$ and L$^2$, while coil 23 is connected directly across binding posts $s^1$ and $s^3$. The coils 28 and 29 of the galvanometer 21 are connected in series to binding posts $s^1$ and $s^3$, a switch 40 being included in circuit with the coils.

This apparatus is used in the following manner: An instrument 41 to be calibrated, which may be a transmitting instrument or a receiving instrument of the type shown in Fig. 1, has its armature winding terminals S$^1$, S$^2$ and S$^3$, marked by inspection in clockwise order, connected respectively to binding posts $s^1$, $s^2$ and $s^3$, while the rotor terminals R$^1$ and R$^2$, similarly marked, are connected respectively to binding posts $r^1$ and $r^2$. A suitable source 42 of alternating current is connected across binding posts L$^1$ and L$^2$. The first operation is to check the marking of the armature winding terminals. To do this the rotor of instrument 41 carrying the field winding 43 is first set in a position in which no voltage is induced across terminals S$^1$ and S$^3$. In setting the field winding on this position, switch 22 is placed in open position, as shown in the drawing, and switch 40 closed. The field winding is now turned to a position giving a very slight or no vibration of the galvanometer reed 30, this position being shown in the drawing, and clamped or suitably held in this position. It will be observed that the voltages induced across terminals S$^1$ and S$^2$ and S$^2$ and S$^3$ are equal, with the field winding in this position, since the voltages induced in legs 41$^a$ and 41$^c$ are equal. Switch 40 is now opened and switch bar 37 thrown to the left. It will be observed that armature coils 23 and 24 are now connected across terminals S$^1$ and S$^2$, and S$^3$ and S$^2$ respectively, and since equal voltages are induced across these pairs of terminals and impressed on the coils, the pointer 26 will stand in its zero position in the middle of the scale. The field winding 43 is now turned slightly in a predetermined direction, such as clockwise from this position, which should cause the pointer 26 to move in some predetermined direction, for example, toward the left. Should the pointer move toward the right, then it will be known that the terminals S$^1$ and S$^3$ are wrongly marked and should be reversed. It will be observed that when the field winding 43 is turned from this position, the voltage induced in one of the legs 41$^a$ and 41$^c$ will increase while the voltage induced in the other leg will decrease. When the field winding is moved from this position in a definite direction, the voltage should increase in a definite leg, for example, 41$^c$, provided the temporary marking of the armature terminals is correct. This increase in voltage in leg 41$^c$ is manifested across terminals S$^2$ and S$^3$ and is impressed on armature coil 24, the voltage across terminals S$^1$ and S$^2$ impressed on coil 23 decreasing, whereby the pointer is caused to move toward the left. In case the voltage increase takes place in leg 41$^a$, then the pointer will move toward the right indicating that terminals S$^1$ and S$^3$ are reversed, as previously observed. The relation then established between the marking of the armature terminals and the voltage induced in the armature winding obviously holds good regardless of the polarity of the field winding 43, since the direction of the voltage in the armature windings depends on the direction of the voltage applied to the field winding.

After the marking of the armature terminals has been checked and corrected if necessary, the electrical zero position of the rotor is determined and the dial set on zero in accordance with the method disclosed in the aforesaid application of Edward M. Hewlett and Waldo W. Willard. In this test the direction of the voltage induced across terminals S$^1$ and S$^3$ when the field winding is turned in a definite direction, such as clockwise, from a position of zero voltage across terminals S$^1$ and S$^3$, is compared with the direction of the voltage impressed on the field winding. Since the polarity of the supply source is fixed, then the electrical zero position of the rotor can be determined in this manner, for the rotor can stand in only one of its two positions of zero voltage across S$^1$ and S$^3$ in order to cause the voltage induced across terminals S$^1$ and S$^3$ when the rotor is moved in a given direction from this position to have a definite relation to the polarity of the source of supply 42.

In making this test the switch bar 37 is thrown to the right whereby coil 24 is connected through the field coils across the source of supply 42 while coil 23 is connected directly across terminals S$^1$ and S$^3$. The field winding 43 is now turned back to the position first determined, indicated in the drawing. The pointer 26 should now stand to the left of its zero position, the pointer being moved under the influence of coil 24 since zero voltage is impressed on coil 23. The field winding 43 is now turned in a clockwise direction causing a voltage to be induced across terminals S$^1$ and S$^3$ which voltage is impressed on coil 23. This should cause pointer 26 to move in a definite direction, for example, toward the right, which indicates the relation which it is desired to establish, that is, that terminals $S^1$ and $S^3$ have the same polarity as the voltage applied to terminals $R^1$ and $R^2$. In case the pointer 26 moves in the opposite direction, that is, farther toward the left, then it is known that the polarity of terminals $S^1$ and $S^3$ is different than the polarity of terminals $R^1$ and $R^2$. The field winding must then be rotated through 180 degrees whereupon the desired voltage relation will be established, pointer 26 moving toward the right upon rotation of the field winding in a clockwise direction. This is the true electrical zero position. The field winding is next set accurately in this position by moving switch bar 37 to its central or open position and closing switch 40 whereby the galvanometer 21 is connected across terminals $S^1$ and $S^3$. The field winding is now adjusted until the reed 30 ceases to vibrate indicating a condition of zero voltage across terminals $S^1$ and $S^3$. The rotor carrying the field winding is now suitably held or clamped in this true electrical zero position and the dial 15 secured in mechanical zero position on the rotor, that is, so as to indicate zero with reference to the stationary mark 16.

In Fig. 6 I have shown the connections for the apparatus shown in Fig. 4 when used to calibrate a so called transformer 45. As shown, the transformer has similar polycircuit armature windings 46 and 47 on its rotor and stator elements respectively, these windings being shown as each comprising three legs connected in Y relation, and having their terminals temporarily marked in clockwise order. The purpose of the transformer is to introduce differences in angular relation between the transmitting and the receiving instruments, for example, for the purpose of introducing corrections. It is connected between the transmitting and the receiving instruments, the terminals of its rotor winding being connected to similar terminals on the armature winding of the transmitting instrument and the terminals of its stator winding being connected to similar terminals on the armature winding of the receiving instrument, or vice versa. The terminals of the rotor and stator windings are marked in order, for example, in a clockwise direction when looking at the slip ring end.

In calibrating the transformer in accordance with my invention I employ a transmitting or receiving instrument 48 of the type shown in Figs 1 to 3 inclusive which has been calibrated in accordance with the method disclosed in connection with Fig. 5. In accordance with one method terminals $S^1$, $S^2$ and $S^3$ of the armature winding of instrument 48 are connected respectively to terminals $R^1$, $R^2$ and $R^3$ of the rotor winding 46 and terminals $S^1$, $S^2$ and $S^3$ of the stator winding 47 are connected respectively to binding posts $s^1$, $s^2$ and $s^3$. The field winding terminals $R^1$ and $R^2$ of instrument 48 are connected to the binding posts $r^1$ and $r^2$. The first step is to check the marking of the terminals of the winding 46. For this step switches 22 and 40 are opened and any two of the terminals of winding 47 are temporarily short circuited. The rotor of the instrument 48 is then turned through a small angle and the direction of the resulting rotation of the transformer rotor or winding 46 noted. It will be observed that the turning of the rotor of instrument 48 should cause a corresponding rotation in the same direction of the field set up by the transformer rotor winding 46 and this field reacting on the short circuited portion of the stator winding 47 should cause the transformer rotor to turn in a direction opposite to the motion applied to the rotor of the instrument 48. In case the transformer rotor turns in the same direction as that in which the rotor of instrument 48 is turned, this indicates that the field set up by winding 46 tends to rotate in a direction opposite to the direction in which the rotor of instrument 48 is turned and, therefore, the terminals of winding 46 are incorrectly marked. If this latter condition is found to exist the marking of the terminals must be corrected.

After checking the marking of the terminals of rotor winding 46 the remaining tests for the transformer are substantially the same as described in connection with Fig. 5 for a transmitting or receiving instrument. In carrying out these tests, the instrument 48 is set on true zero and secured in this position throughout the test. With the rotor of instrument 48 thus secured in zero position the voltage induced across its terminals $S^1$ and $S^3$ is zero so that in effect a single phase voltage is thereby applied to the rotor winding 46, this voltage being applied between terminal $R^2$ and the two terminals $R^1$ and $R^3$. A field is thus set up in the rotor winding 46, this field corresponding to the field set up by the rotor of the instrument 48, and having a fixed relation with winding 46 so that it is in effect a single phase field. For the purpose of test, therefore, the transformer is temporarily converted into a transmitting or receiving instrument and during the remainder of the test is treated as such. Obviously, any suitable source of single phase alternating current may be used for energizing winding 46, one side of the source being connected to terminal $R^2$ and the other side to terminals $R^1$ and $R^2$ connected together. For the purpose of convenience, however, an instrument 48 has been used as the source of voltage, since the voltage of instrument 48 is adapted to the winding 46. The line voltage applied to the rotor of instrument 48 may not be suitable for winding 46 and if it were used it might be necessary to use a suitable resistance or transformer to regulate it. The remainder of the tests for marking the stator winding terminals S¹, S² and S³ and setting the transformer on zero will be understood with reference to the description in connection with Fig. 5. The zero setting of the transformer thus found is the position in which the transformer will not introduce any changes or corrections in the angular relation of the transmitting and receiving instruments between which the transformer is connected.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The method of calibrating an instrument for the transmission of angular motion provided with a field winding and a polycircuit armature winding which consists in marking the terminals of said windings, impressing an alternating voltage on said field winding, checking the marking of the terminals of said armature winding with the change in voltage produced across two of said terminals by relative rotation of said windings in a predetermined direction, setting said field winding in an electrical zero position, and then setting the indicating means associated with said instrument in a mechanical zero position.

2. The method of calibrating an instrument for the transmission of angular motion provided with a field winding and a polycircuit armature winding which consists in marking the terminals of said windings, impressing an alternating voltage on said field winding, checking the marking of the terminals of said armature winding with the change in voltage produced across a predetermined pair of said terminals when said field winding is turned in a predetermined direction from a position in which like voltages are induced across two pairs of said armature terminals, setting said field winding in an electrical zero position, and then setting the indicating means associated with said instrument in a mechanical zero position.

3. The method of calibrating an instrument for the transmission of angular motion provided with a field winding and a polycircuit armature winding which consists in marking the terminals of said windings, impressing an alternating voltage on said field winding, checking the marking of the terminals of said armature winding with the change in voltage produced across a predetermined pair of armature terminals when said field winding is turned in a predetermined direction from a position in which no voltage is induced across another pair of armature terminals, setting said field winding in an electrical zero position and then setting the indicating means associated with said instrument in a mechanical zero position.

4. The method of calibrating an instrument for the transmission of angular motion provided with a field winding and a polycircuit armature winding which consists in marking the terminals of said windings, impressing an alternating voltage on said field winding, setting said field winding in a position in which no voltage is induced across a predetermined pair of terminals of said armature winding, moving said field winding from this position in a predetermined direction and checking the marking of the terminals of said armature winding with the change in voltage produced across another pair of terminals of said armature winding resulting from said rotation, setting said field winding in an electrical zero position, and then setting the indicating means associated with said instrument in a mehanical zero position.

5. Apparatus for calibrating an instrument for the transmission of angular motion provided with a field winding adapted to be energized from a source of alternating current and a polycircuit armature winding, comprising a differential voltage responsive device, and electrical connections between said voltage responsive device and said instrument including a two-way selector switch whereby when said switch is thrown from open position in one direction said device is connected across two pairs of terminals of the armature winding of said instrument and when thrown in another direction from open position said device is connected across another pair of armature terminals and across the terminals of said field winding, a galvanometer, and switching means for connecting said galvanometer across said last mentioned pair of armature winding terminals.

6. The method of calibrating instruments for the transmission of angular motion provided with a field winding and a polycircuit armature winding which consists in marking the terminals of said windings in a predetermined order, impressing an alternating voltage on said field winding, placing said field winding in a position in which the voltage induced in one of the circuits of said armature winding is zero, checking the marking of the terminals of said armature winding with the change in voltage produced in said armature winding upon rotation of said field winding from said position, setting the field winding in a zero position such that when the field winding is moved from this zero position in a predetermined direction a predetermined change in voltage is produced across one pair of terminals of said armature winding, and then setting the indicating means associated with said instrument in a mechanical zero position.

7. The method of calibrating instruments for the transmission of angular motion provided with a field winding and a polycircuit armature winding which consists in marking the terminals of said field winding in a predetermined order, temporarily marking the terminals of said armature winding in a predetermined order, impressing an alternating voltage on said field winding, turning said field winding to a position in which no voltage is induced in said armature winding across a predetermined pair of said terminals, turning said field winding from this position in a predetermined direction and noting the direction of change produced thereby in the voltage across another pair of armature terminals, checking the markings of said terminals in a predetermined relation to the direction of change of said voltage, setting the field winding in a position of zero voltage across said first pair of terminals such that when the field winding is moved from this position in a predetermined direction the voltage induced across said first pair of terminals has a predetermined directional relation to the voltage impressed on said field winding, and setting the indicating means associated with said instrument in a zero indicating position.

8. The method of marking the terminals of an instrument for the transmission of angular motion provided with a field winding and a polycircuit armature winding which consists in marking the terminals of said field winding in a predetermined order, impressing an alternating voltage on said field winding, and then marking the armature winding terminals in a predetermined relation with the change in voltage produced across a predetermined pair of said terminals when said windings are relatively displaced in a predetermined direction from a position in which no voltage is induced across one pair of said terminals.

9. The method of marking the terminals of an instrument for the transmission of angular motion provided with a field winding and a polycircuit armature winding which consists in marking the terminals of said field winding in a predetermined order, impressing an alternating voltage on said field winding, turning said field winding to a position in which the voltage across a pair of said armature winding terminals is zero, turning said field winding from this position in a predetermined direction and noting the direction of change produced thereby in the voltage across another pair of armature terminals, and then marking the armature winding terminals in accordance with a predetermined relation with said change in voltage.

10. The method of marking the terminals of an instrument for the transmission of angular motion provided with a field winding and a three-circuit armature winding having three terminals which consists in marking the terminals of said field winding in a predetermined order, impressing an alternating voltage on said field winding, turning said field winding to a position in which equal voltages are induced in two of the circuits of said armature winding, turning said field winding from this position in a predetermined direction and noting the direction of change produced thereby in the voltage induced in one of said circuits, and then marking said armature winding terminals in a predetermined relation with said change in voltage.

In witness whereof, I have hereunto set my hand this 19th day of June 1923.

ALVARADO L. R. ELLIS.